(12) United States Patent
Wallestad et al.

(10) Patent No.: US 11,903,343 B2
(45) Date of Patent: Feb. 20, 2024

(54) REGENERATIVE HANDLER RAISE AND GRAVITY LOWER CYLINDER

(71) Applicant: Deere & Company, Moline, IL (US)

(72) Inventors: Steven D. Wallestad, Ankeny, IA (US); Mark A. Cracraft, Johnston, IA (US); James T. Noonan, Bondurant, IA (US)

(73) Assignee: DEERE & COMPANY, Moline, IL (US)

( * ) Notice: Subject to any disclaimer, the term of this patent is extended or adjusted under 35 U.S.C. 154(b) by 165 days.

(21) Appl. No.: 17/398,204

(22) Filed: Aug. 10, 2021

(65) Prior Publication Data

US 2021/0360858 A1    Nov. 25, 2021

Related U.S. Application Data

(63) Continuation of application No. 16/197,880, filed on Nov. 21, 2018, now Pat. No. 11,109,534.

(51) Int. Cl.
  *A01F 15/08*    (2006.01)
  *A01D 87/12*    (2006.01)
  (Continued)

(52) U.S. Cl.
  CPC .......... *A01D 87/127* (2013.01); *F15B 11/024* (2013.01); *F15B 11/10* (2013.01);
  (Continued)

(58) Field of Classification Search
  CPC ................ A01F 15/0883; A01F 15/085; A01F 15/0875; A01F 2015/0891; F15B 11/024;
  (Continued)

(56) References Cited

U.S. PATENT DOCUMENTS 4,072,096 A    2/1978    Phillips
5,415,076 A *  5/1995    Krone ................... F15B 11/024
                                                91/440
(Continued)

FOREIGN PATENT DOCUMENTS

DE    2517340 A1    10/1976

OTHER PUBLICATIONS

DE2517340 A1 Machine Translation to English from espacenet (1976).

*Primary Examiner* — Kenneth Bomberg
*Assistant Examiner* — Michael Quandt
(74) *Attorney, Agent, or Firm* — Taft Stettinius & Hollister LLP; Stephen F. Rost

(57) ABSTRACT

Hydraulic power savings for a rear module handler cylinder of a round module cotton harvester is possible by using a regenerative hydraulic arrangement for raising an empty handler and using gravity to lower the handler. A bale handler system for a cotton picker baler includes a handler for receiving a round module that is movable between upright and lowered positions and a handler cylinder operably connected to the handler. The handler cylinder system includes a regenerative valve. The regenerative valve is engaged when the handler moves to the upright position during regenerative handler raise mode of operation, the regenerative valve is not engaged when the handler moves to the lowered position during float handler lower mode of operation. While in the float handler lower mode of operation, the handler cylinder retracts and diverts an oil flow pressure from a base end to a rod end of the handler cylinder.

13 Claims, 10 Drawing Sheets

(51) Int. Cl.
  *F15B 11/10* (2006.01)
  *F15B 11/024* (2006.01)
  *A01D 46/08* (2006.01)

(52) U.S. Cl.
  CPC ........ *A01D 46/084* (2013.01); *A01F 15/0883* (2013.01); *F15B 2211/3058* (2013.01)

(58) Field of Classification Search
  CPC ...... F15B 2011/0243; F15B 2011/0246; F15B 2211/3058; F15B 2211/7741
  USPC .................................................. 91/436, 437
  See application file for complete search history.

(56) References Cited

U.S. PATENT DOCUMENTS

| | | | | |
|---|---|---|---|---|
| 6,421,996 | B1 * | 7/2002 | Deutsch | A01D 46/084 100/88 |
| 6,941,740 | B2 * | 9/2005 | Fox | A01F 15/07 100/88 |
| 6,973,779 | B2 * | 12/2005 | Naaktgeboren | A01F 15/085 60/445 |
| 9,107,348 | B2 | 8/2015 | Smith | |
| 10,208,456 | B2 | 2/2019 | Ku | |
| 10,383,283 | B2 * | 8/2019 | Heaney | A01F 15/071 |
| 2013/0126023 | A1 | 5/2013 | Huynh | |
| 2018/0252243 | A1 | 9/2018 | Pfaff | |

* cited by examiner

REGENERATIVE HANDLER RAISE AND GRAVITY LOWER CYLINDER

RELATED APPLICATIONS

This application is a continuation of U.S. patent application Ser. No. 16/197,880 filed Nov. 21, 2018, the disclosure of which is hereby incorporated by reference in its entirety.

FIELD OF THE DISCLOSURE

The present disclosure relates to a work vehicle having an adjustable work implement, and in particular to a cotton harvester with a bale handler system having a regenerative and gravity lower hydraulic circuits for reducing overall peak vehicle power needs.

BACKGROUND OF THE DISCLOSURE

In certain operating conditions of round module cotton harvesters, there are many systems that require power at the same time. As one can appreciate, there is only a limited amount of engine power available for all of these systems based on the engine provided with the harvester. One solution is to provide a larger engine which in turn provides more power, however a larger engine is also more costly which is undesirable for a consumer. A smaller engine which typically has a lower cost is desirable for the consumer but it provides less power.

One example operation of round module cotton harvesters in which many systems require power around the same time is after the handler lowers a module to the ground, the accumulator empties loose cotton into the baler, the baler is operating, and raising an empty handler. The handler can be operated with a rear module handler cylinder. Lowering the handler with a module thereon to the ground requires pressurizing a rod side of a rear module handler cylinder. Even though the weight of the handler and the module is causing the rear module handler cylinder to retract, auxiliary pump flow is still required at full compensation pressure to assist in retracting the rear module handler cylinder. Additional power is required to drive an auxiliary pump to the lower the handler at a potential time when the engine already has short-term high power needs for other cotton handling functions. With limits on engine maximum and boost power levels, keeping peak power below a threshold is critical in managing cost effective engine and exhaust hardware options.

After a module is lowered to the ground with the handler, the rear module handler cylinder must be extended with low pressure requirements to a fully raised handler state to allow a shorter machine for ease of turning and to minimize headland damage when the handler is left in a lowered state. For example, the operator may have reached an end of a field and require turning to continue harvesting cotton. Even though the extension of the rear module handler cylinder requires low pressure because there is not a module loaded on the handler, the pressure compensated pump still needs to operate at the high standby pressure and must provide the required flow to extend the rear module handler cylinder. The extension of the rear module handler cylinder with an empty handler, i.e., no bale, also occurs when other machine functions are requiring temporarily high engine power spikes. The difference between required pressure and actual compensation pressure is extra excessive power requirement and excessive heat rejection to the cooling system for both the engine and hydraulics.

Thus there is a need for improvement for power savings for a rear module handler.

SUMMARY

The present disclosure may comprise one or more of the following features and combinations thereof.

According to one embodiment of the present disclosure, a method for operating a bale handler system of a cotton picker baler, the bale handler system including a handler for receiving a round module and a handler cylinder having a regenerative valve, the handler operably connected to the handler cylinder, the method comprising: determining that the handler is to be raised to an upright position; operating the bale handler system in a regenerative handler raise mode of operation upon satisfaction of the determination that the handler is to be raised to the upright position; and while in the regenerative handler raise mode of operation, actuating the regenerative valve to regulate an oil flow pressure to the handler cylinder.

In one example, further comprising: while in the regenerative handler raise mode of operation, raising the handler to the upright position.

In a second example, further comprising: determining that the handler is to be lowered to a lowered position; operating the bale handler system in float handler lower mode of operation upon satisfaction of the determination that the handler is to be lowered to the lowered position; and while in the float handler lower mode of operation, operating the handler cylinder to retract and divert an oil flow pressure from a base end to a rod end of the handler cylinder.

In a third example, wherein the bale handler system includes a solenoid valve; and further comprising: activating the solenoid valve to an open state wherein a first amount of oil flows from the base end of the handler cylinder to the rod end of the handler cylinder as the handler cylinder retracts.

In a fourth example, wherein the bale handler system includes a reservoir; and wherein a second amount of oil flows from the base end of the handler cylinder to the reservoir as the handler cylinder retracts.

In a fifth example, wherein the bale handler system includes an auxiliary pump operably connected to the handler cylinder, wherein the auxiliary pump does not provide an oil flow to the handler cylinder during the float handler lower mode of operation.

In a sixth example, while in the float handler lower mode of operation, lowering the handler to the lowered position.

According to another embodiment of the present disclosure, a method for operating a bale handler system of a cotton picker baler, the bale handler system including a handler for receiving a round module and a handler cylinder, the handler operably connected to the handler cylinder, the method comprising: determining that the handler is to be lowered to a lowered position; operating the bale handler system in float handler lower mode of operation upon satisfaction of the determination that the handler is to be lowered to the lowered position; and while in the float handler lower mode of operation, operating the handler cylinder to retract and divert an oil flow pressure from a base end to a rod end of the handler cylinder.

In one example of this embodiment, wherein the bale handler system includes a solenoid valve; and further comprising: activating the solenoid valve to an open state wherein a first amount of oil flows from the base end of the handler cylinder to the rod end of the handler cylinder as the handler cylinder retracts.

In a second example, wherein the bale handler system includes a reservoir; and wherein a second amount of oil flows from the base end of the handler cylinder to the reservoir as the handler cylinder retracts.

In a third example, wherein the bale handler system includes an auxiliary pump operably connected to the handler cylinder, wherein the auxiliary pump does not provide an oil flow to the handler cylinder during the float handler lower mode of operation.

In a fourth example, while in the float handler lower mode of operation, lowering the handler to the lowered position.

In a fifth example, wherein the handler cylinder includes a regenerative valve; and, further comprising: determining that the handler is to be raised to an upright position; operating the bale handler system in a regenerative handler raise mode of operation upon satisfaction of the determination that the handler is to be raised to the upright position; and while in the regenerative handler raise mode of operation, actuating the regenerative valve to regulate an oil flow pressure to the handler cylinder.

In a sixth example, further comprising: while in the regenerative handler raise mode of operation, raising the handler to the upright position.

According to another embodiment of the present disclosure, a bale handler system for a cotton picker baler comprising: a handler for receiving a round module, the handler movable between an upright position and a lowered position; and a handler cylinder operably connected to the handler, the handler cylinder having a regenerative valve operably connected thereto, the regenerative valve engaged when the handler is engaged to move to the upright position during a regenerative handler raise mode of operation, the regenerative valve not engaged when the handler is engaged to move to the lowered position during a float handler lower mode of operation.

In one example, further comprising: a restriction valve operably connected to the handler cylinder, the restriction valve engaged when the handler moves to the lowered position during the float handler lower mode of operation.

In a second example, further comprising: a pilot operated check valve operably connected to the handler cylinder and a plurality of hoses, the pilot operated check valve configured to operate in a locked configuration when one of the plurality of hoses has failed such that the handler is restricted from movement to the lowered position, the pilot operated check valve configured to operate in an unlocked configuration when none of the plurality of hoses has failed such that the handler is not restricted from movement to the lowered position.

In a third example, further comprising: an auxiliary pump operably connected to the handler cylinder, wherein the auxiliary pump does not provide an oil flow to the handler cylinder during the float handler lower mode of operation.

In a fourth example, wherein the handler cylinder includes a first handler cylinder and a second handler cylinder.

In a fifth example, further comprising: a control valve block operably connected to the handler cylinder.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views. The exemplifications set out herein illustrate embodiments of the invention, and such exemplifications are not to be construed as limiting the scope of the invention in any manner.

DETAILED DESCRIPTION

Figure 1:
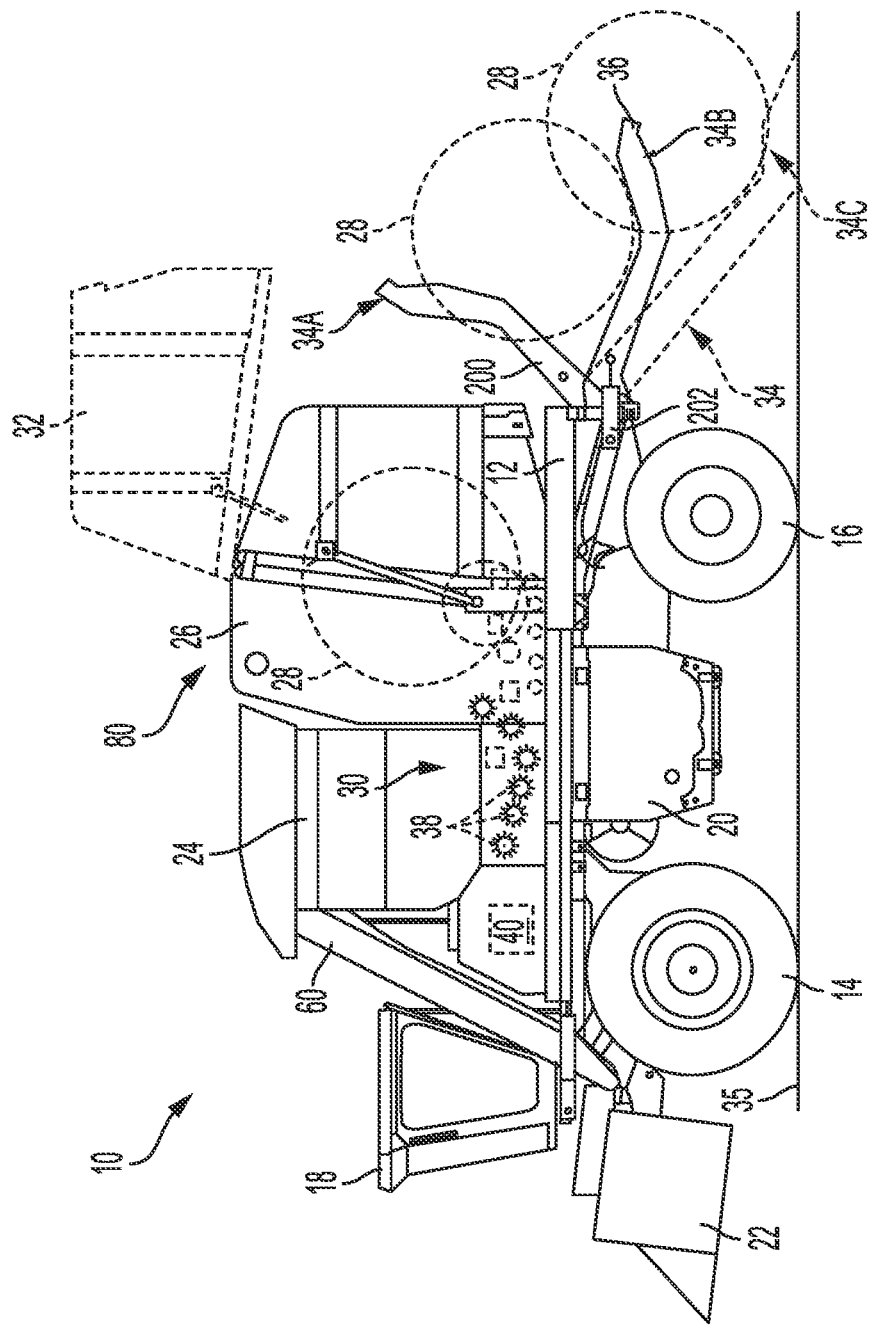
FIG. 1 is a side elevational view of a work vehicle, and more specifically, of an agricultural vehicle such as a cotton harvesting machine.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

FIG. 1 is a side elevational view of an agricultural vehicle, and more particularly a cotton picker baler 10, including a frame 12 supported on a pair of front wheels 14 and a set of rear wheels 16. Although not discussed, the present disclosure is applicable to a cotton stripper machine and the cotton picker baler 10. An operator cab 18 is mounted on the frame 12 and contains various controls for the vehicle 10 so as to be within the reach of a seated or standing operator. In one aspect, these controls may include a steering wheel and a control console including a display as would be understood by one skilled in the art. An engine 20 is mounted on the frame 12 beneath a housing and supplies power for driven components of the cotton picker baler 10. The engine 20, for example, is configured to drive a transmission (not shown), which is coupled to drive the front wheels 14 at various selected speeds and either in forward or reverse modes. In other embodiments, the rear set of wheels 16 is driven to move the cotton picker baler 10, or all of the wheels are driven in an all-wheel drive configuration to move the cotton picker baler 10.

The cab 18 defines an operator workstation including a seat, which is supported by the frame 12. The operator workstation, in different embodiments, includes one or more of an operator user interface, steering wheel, a joystick, and an accelerator pedal. Pedals for a brake and a hydrostatic control are also located in the cabin 18, but are not shown.

The user interface includes a plurality of operator selectable buttons configured to enable the operator to control the operation and function of the cotton picker baler 10. The user interface, in one embodiment, includes a user interface screen or display having a plurality of user selectable buttons to select from a plurality of commands or menus, each of which are selectable through a touch screen having a display. In another embodiment, the user interface includes a plurality of mechanical push buttons as well as a touch screen. In another embodiment, the user interface includes a display screen and only mechanical push buttons.

A harvesting structure or header 22 is couplable to the frame 12. The illustrated harvesting structure 22 is configured to remove cotton from a field 35, the position of which is adjustable with respect to the frame 12. Alternatively, the harvesting structure 22 may be configured to remove hay, corn stalks, or any other crop. An air duct system 60 is couplable to the harvesting structure 22. An accumulator or basket 24 is couplable to the air duct system 60. The accumulator 24 is configured to receive cotton, or other crop, from the harvesting structure 22 via the air duct system 60. The accumulator 24 receives the picked cotton where it is stored in sufficient quantity to enable a baler 26 to bale the cotton in a round bale 28. A feeder 30 is couplable to the frame 12. The feeder 30 is configured to receive cotton, or other crop, from the accumulator 24. The accumulator 24 acts as a storage buffer to allow for wrapping and ejecting of the previous module to allow non-stop harvesting. The feeder 30 includes a plurality of rollers 38 configured to transfer the cotton, or other crop, to a round module builder 80. The cotton picker baler 10 includes a controller 40 that is operatively connected to the user interface, the bale handler system 34, and remaining components.

Cotton in the round module builder 80 is in a baler zone where it is compressed and baled into the round bale 28. Once a bale 28 is complete, a door 32 is opened where the bale 28 exits from the baler and onto a bale handler system 34. The bale handler system 34 is positionable between a relatively upright position 34A, a relatively horizontal position 34B, and a relatively lowered position 34C. In other embodiments, an end 36 of the bale handler system 34 moves to a position toward the ground as illustrated at lowered position 34C where the bale rolls off the back for later processing. Further description of the baler handler system 34 is described below.

While a round module builder 80 is shown and described as part of a cotton picker baler 10, this disclosure is not limited to such an application of a module builder. More specifically, other embodiments considered for this disclosure include, but are not limited to, a pull type round baler. A pull type round baler may not include a chassis, header, air system, and other components shown on the cotton picker baler 10. Rather, the pull behind round baler may have a hitch, wheels, and a crop pickup assembly coupled to the round module builder. A person having skill in the relevant art understands how the teachings of this disclosure can be applied to any round-type baler or module builder and this disclosure is not limited in application to the cotton picker baler 10 shown and described herein.

In operation, the cotton picker baler 10 is driven through the field 35 to harvest cotton or other crop. The illustrated cotton picker baler 10 picks cotton from cotton plants in the field 35. Alternatively, the cotton picker baler 10 may strip the cotton from the cotton plants. Cotton is then transferred to the accumulator 24 via the air duct system 60. The accumulator 24 holds the cotton until a predetermined cotton level is reached and then transfers the cotton to the feeder 30. In an exemplary embodiment, the accumulator 24 transfers cotton to the feeder 30 approximately four times for each round module 28 produced. When the feeder 30 receives cotton, the plurality of rollers 38 are activated to transfer the cotton to the round module builder 80.

After the round module builder 80 receives cotton, a plurality of endless belts (not illustrated) rotate the cotton into the round module 28. After the round module builder 80 receives sufficient cotton from the feeder 30, the round module may be wrapped and the round module 28 can be ejected onto the bale handler system 34. The bale handler system 34 supports the round module 28 and then discharges it from the cotton picker baler 10. The cotton picker baler 10 is adapted for movement through the field 35 to harvest cotton.

Figure 2:
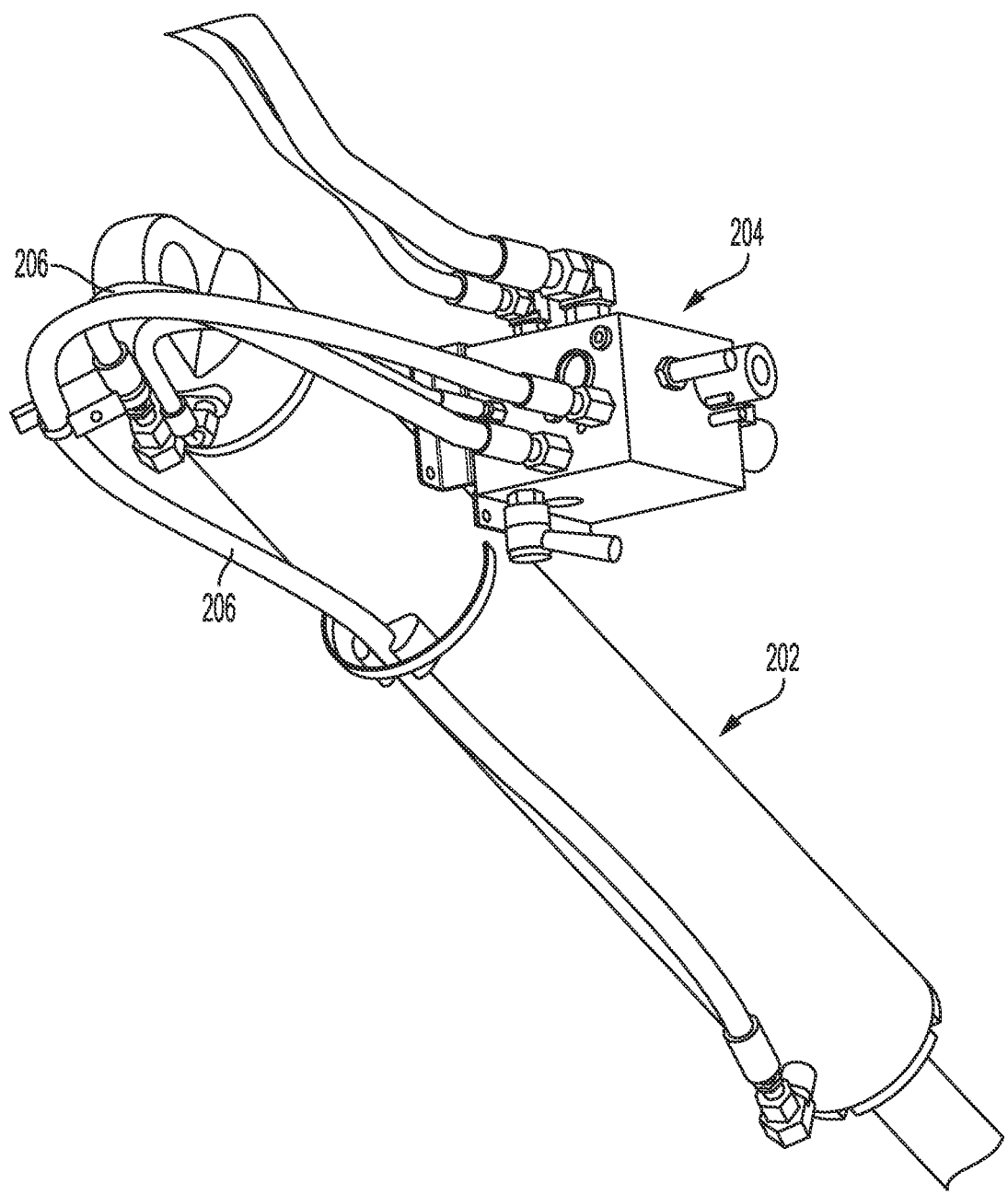
FIG. 2 is a perspective view of a bale handler system having a single handler cylinder of the work vehicle of FIG. 1.

The bale handler system 34 will now be further described. The bale handler system 34 includes a handler 200 that is operated by a handler cylinder 202 which is operatively connected to a control valve block 204 illustrated in FIGS. 2 and 3. The handler 200 is not illustrated in FIG. 2 for ease of illustration of the handler cylinder 202 and the control valve block 204. Although a single handler cylinder 202 is illustrated, it is contemplated that two handler cylinders 202 can be used with this disclosure. The handler cylinder 202 and the control valve block 204 are operatively connected via a plurality of hoses 206 to fluidly pressurize a base end 210 and a rod end 212 of the handler cylinder 202 as needed during operation. The control valve block 204 is operatively connected to the controller 40.

Turning now to FIG. 3, the handler cylinder 202 includes a base end 210 opposite a rod end 212. The handler cylinder 202 includes an integrated check valve (shown externally) in the base end 210. The integrated check valve uses a pilot pressure signal from a manual lock valve 301 integrated with the control valve block 204 to control when the handler cylinder 202 should be in a service lock state such as for example when the baler handler system 34 is in a relatively upright position 34A to enable access to the underside or frame 12 of the cotton picker baler 10. The lock valve 301 also allows service near or underneath the handler 200, leveraging the pilot feature.

Operatively and fluidly connected to the handler cylinder 202 is an auxiliary pump 307 which maintains a standby pressure. In a normal powered mode of operation to raise the bale handler system 34 to the relatively upright position 34A wherein the auxiliary pump 307 provides flow to maintain standby pressure, solenoid valve 303 is opened to allow flow into the base end 210 of the cylinder 202. The flow then travels from the handler cylinder 202, out of the rod end 212 of handler cylinder 202, across solenoid valve 306 and finally returns to a reservoir 308.

Figure 3A:
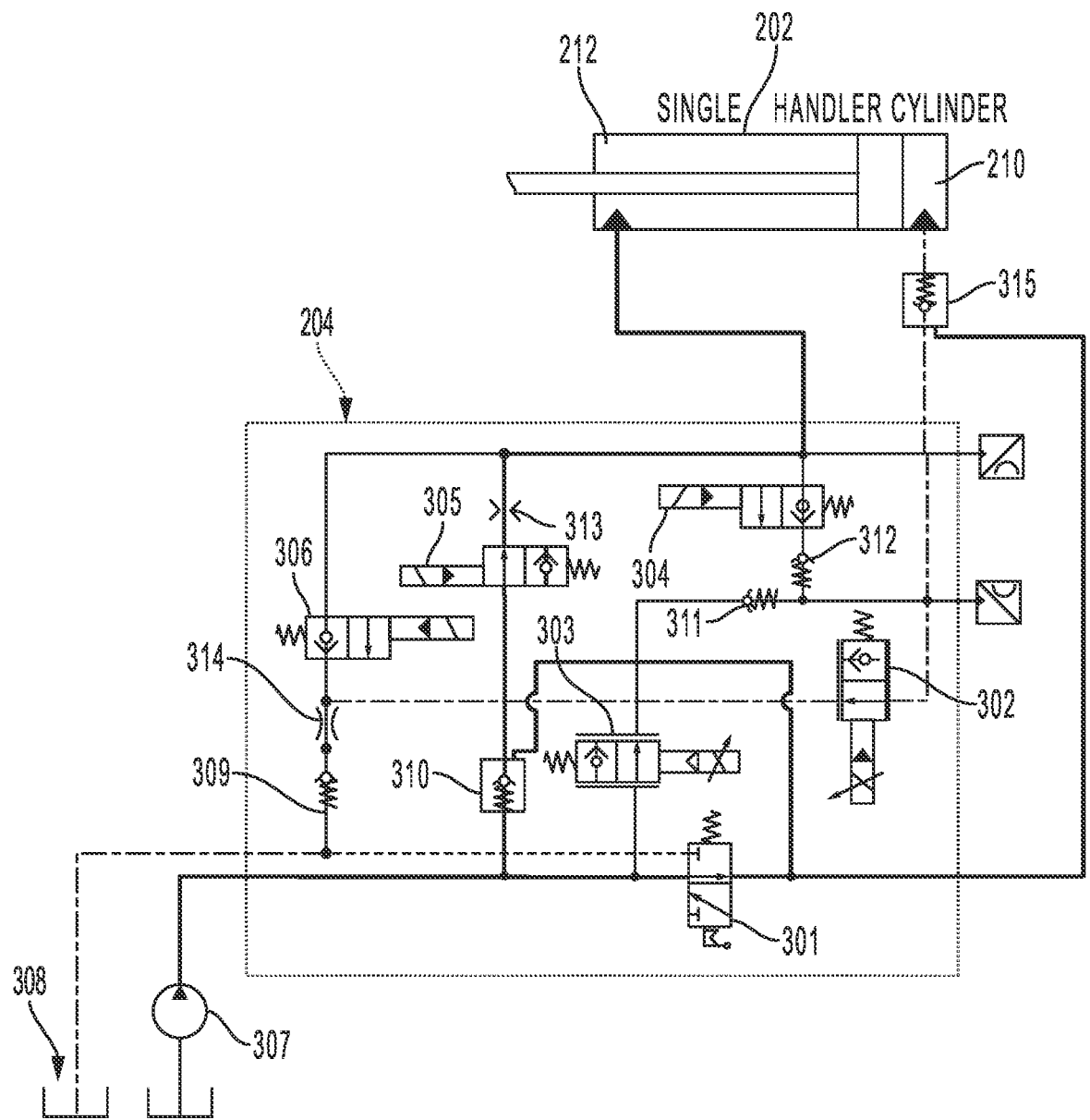
FIG. 3A is a hydraulic schematic diagram for the bale handler system of the work vehicle of FIG. 1 using one single handler cylinder in a normal lower mode of operation.

In a normal powered mode of operation as illustrated in FIG. 3A, to lower the bale handler system 34 to the lowered position 34C wherein the auxiliary pump 307 tries to maintain standby pressure, fluid from auxiliary pump 307 is pumped across a solenoid valve 305 and then across an orifice 313 and into the rod side 212 of the handler cylinder 202. The flow then travels from the handler cylinder 202 as the cylinder retracts, out of the base end 210, across a solenoid valve 302, and then the flow returns to reservoir 308.

Pilot operated check valve 310 can be piloted open to allow pressure flow through solenoid valve 305. The pilot operated check valve 310 is typically built into the manifold. During normal powered mode of operation, the manual lock valve 301 allows pressure from auxiliary pump 307 to open the pilot operated check valve 310 which lets pressure oil flow to solenoid valve 305. Externally lock valve 301 is connected to pilot operated check valve 315 which is operatively connected to the base end 210 of the handler cylinder 202. The pilot operated check valve 315 functions like a lock to keep the handler cylinder 202 from falling to the lowered position 34C if one of the plurality of hoses 206 fails or when the operator wants to lock the handler 200 for service purposes. The pilot operated check valve 315 is located at the handler cylinder 202. It can either be externally mounted or integrated into the base end 210 of the handler cylinder 202.

Figure 3B:
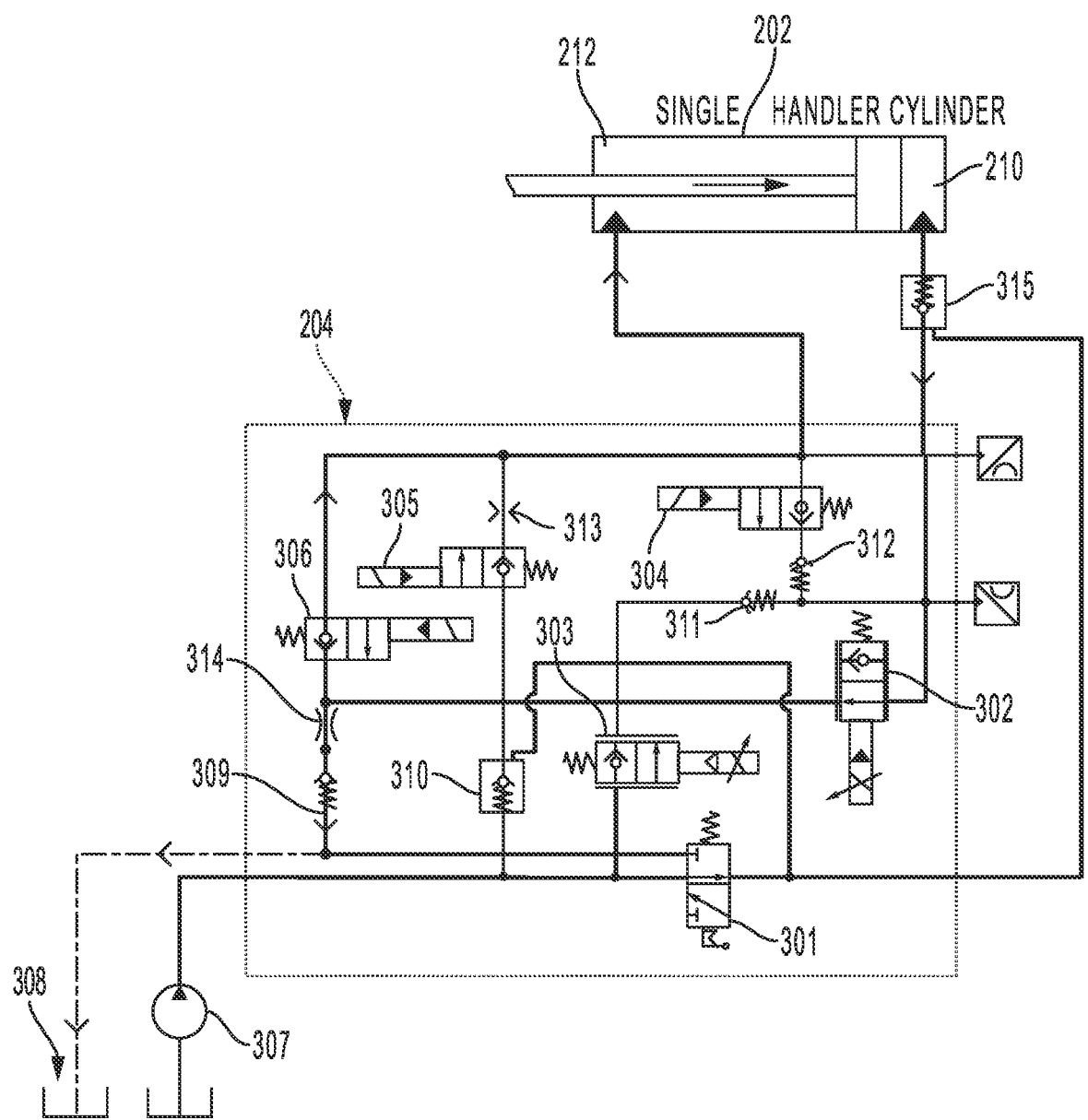
FIG. 3B is the hydraulic schematic diagram from FIG. 3A for the bale handler system of the work vehicle of FIG. 1 using one single handler cylinder in a float or gravity handler lower mode of operation.

Turning now to a float or gravity handler lower mode of operation as illustrated in FIG. 3B, wherein the handler cylinder 202 is extended and the bale handler system 34 contains or holds the round bale 28 in the upright position 34A, the horizontal position 34B, or some position there between, and the bale handler system 34 is lowered to the position 34C. Alternatively, the bale handler system 34 may not contain the round bale 28 and maybe empty when the bale handler system 34 is lowered. In the float or gravity lower mode of operation, no additional fluid pressure from the auxiliary pump 307 is required to lower the bale handler system 34 to position 34C. Instead of driving down the bale handler system 34 by pressurizing the rod end 212 of the handler cylinder 202, even though the weight of bale handler system 34 and weight of the round bale 28 has the ability to force the bale handler system 34 in a downward direction, the solenoid valve 302 is proportionally opened to allow gravity to lower the bale handler system 34 to the lowered position 34C. When solenoid valve 302 is proportionally actuated to an open state, oil from the base end 210 of the handler cylinder 202 is allowed to exit and flow through solenoid valve 302. The flow that travels through solenoid valve 302 has two paths thereafter. A first path for a first portion of the oil is to travel through the check feature section of solenoid valve 306 and replenish flow into the rod side 212 of the handler cylinder 202 as the handler cylinder 202 retracts. A second path for a second portion of the oil flow returns back to the reservoir 308 through orifice 314 and a check valve 309. Regardless of the flow path, there is no required flow from the auxiliary pump 307 and therefore no power requirement for auxiliary pump 307 to retract the handler cylinder 202 and lower the bale handler system 34 to the lowered position 34C. The end effect is that the bale handler system 34 can be lowered through proportional control without additional power from the auxiliary pump 307 and the engine 20 to lower the bale handler system 34 thereby allowing other power consuming systems in the cotton picker baler 10 to receive extra power that would have gone to achieve this function.

Figure 3C:
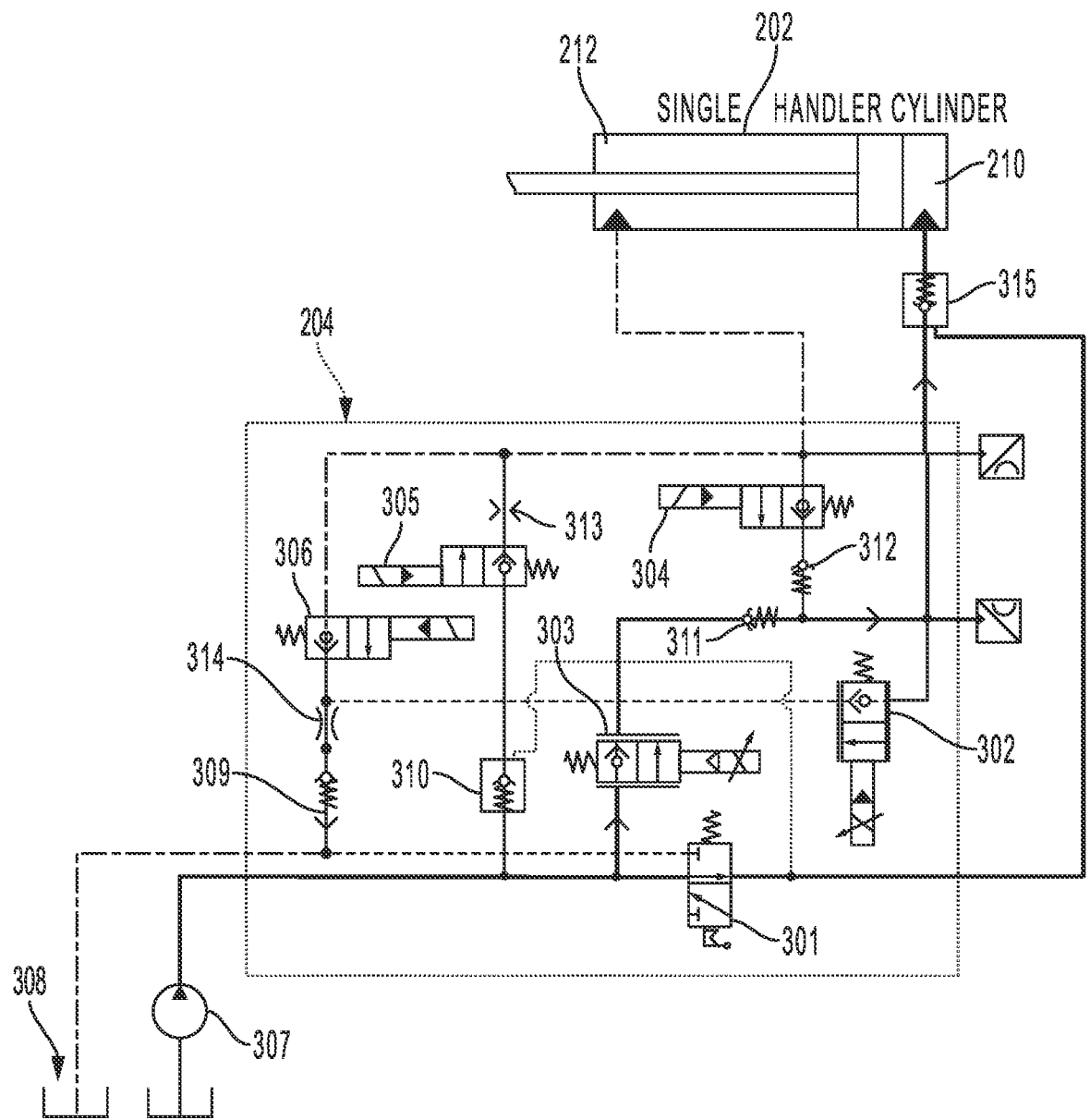
FIG. 3C is the hydraulic schematic diagram from FIG. 3A for the bale handler system of the work vehicle of FIG. 1 using one single handler cylinder in a normal raise mode of operation.

When raising the bale handler system 34 to a storage or upright position 34A after lowering the round bale 28 to the field 35 or a normal raise is illustrated in FIG. 3C, the actual required pressure to extend the handler cylinder 202 is low at least because there is no bale weight on the bale handler system 34, however without a regenerative valve associated with the handler cylinder 202, the auxiliary pump 307 would need to deliver standby pressure to the handler cylinder 202. Therefore it is beneficial for a regenerative handler raise mode of operation to reduce the oil flow and thereby the power requirements to extend the handler cylinder 202.

Figure 3D:
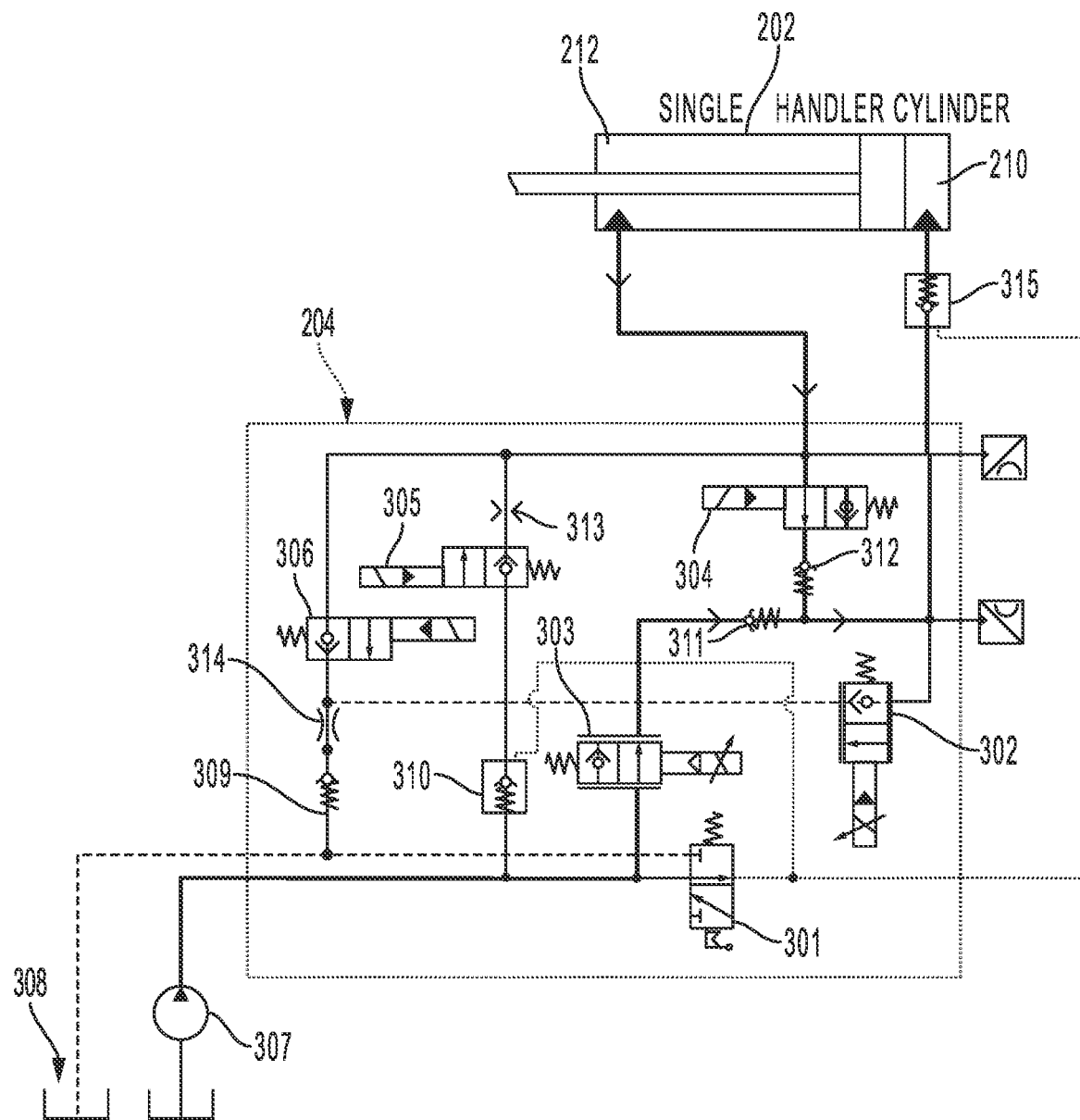
FIG. 3D is the hydraulic schematic diagram from FIG. 3A for the bale handler system of the work vehicle of FIG. 1 using one single handler cylinder in a regenerative handler raise mode of operation.

In the regenerative handler raise mode of operation illustrated in FIG. 3D, oil is diverted from the rod end 212 of the handler cylinder 202 to the base end 210 through a regenerative valve 304 wherein the oil is regenerated from the rod end 212 to the base end 210. The regenerative valve 304 enables the handler cylinder 202 to move faster and also to save power as full power from the auxiliary pump 307 is not required in the regenerative handler raise mode of operation. The regenerative valve 304 enables the operation of the bale handler system 34 to the upright position 34A quickly and also makes available the extra power to other power consuming systems such as the accumulator 24, the door 32, or the air duct system 60 on the cotton picker baler 10. By using the regenerative valve 304 the only required flow is equal to the rod area of the handler cylinder 202 times the handler cylinder 202 required travel speed. To extend the handler cylinder 202 in a regenerative state, pressure and flow is generated from auxiliary pump 307 and passes through a proportionally energized opened solenoid valve 303. The oil continues to pass through a check valve 311 and the pilot operated check 315 and into the base end 210 of the handler cylinder 302. When the handler cylinder 302 is being raised in a regenerative state, oil passes out of the rod end 212 and passes through regenerative valve 304 and through a check valve 312 to direct rod oil back to the base end 210 of the handler cylinder 202. The only oil requirement from the auxiliary pump 307 is the effective rod area on the base end 210 of the handler cylinder 202 times the raise speed of the handler cylinder 202. The lower pressure requirement to extend the handler cylinder 202 works on the same effective rod area on the base end 210 since the oil pressure is approximately the same on the rod end 212 and base end 210 of a cylinder piston of the handler cylinder 302. The end effect of leveraging the regenerative valve 304 for extending the handler cylinder 302 without the round bale 28 on the bale handler system 34 is to significantly reduce the flow requirement and thereby the pump power requirement of the auxiliary pump 307 when there are other competing power needs of the cotton picker baler 10 occurring at the same time.

Some competing power needs can include but are not limited to emptying the accumulator 24, wrapping the full bale 28, collecting cotton from the field 35 with the harvesting structure 22, the air duct system 60 collecting cotton and transferring to the accumulator 24. All of these systems as well as other systems require power and the use of the regenerative handler raise mode of operation and/or the gravity lower or float down operating condition enables a power savings as well as does not require slowing down the engine 20 or losing power to the air duct system 60 and/or the accumulator 24 and thereby avoids plugging the cotton picker baler 10 with cotton or other crop material. Moreover, the engine 20 includes a rated power and a boost power, wherein the rated power is used for normal operations and the boost power is used for a short duration of time when cotton picker baler 10 requires additional or higher power. One of ordinary skill in the art appreciates that the boost power is only available for a short duration of time but is necessary for operating the cotton picker baler 10 when multiple power consuming systems require power for the short duration of time. By operating in the float down or the regenerative handler raise condition for the bale handler system 34, the engine 20 can save some power and supply or make available this power savings to other power consuming systems when performing other tasks such as emptying the accumulator 24 or continuing operation of the air duct system 60.

Although one embodiment of the control valve block 204 is illustrated in a schematic in FIGS. 3A-3D, it is contemplated there could be various or different schemes and arrangements for the solenoid valves that can accomplish the same or similar end results of allowing a regenerative raise and gravity lower control of the bale handler system 34.

Due to the reduced flow needs to the handler cylinder 202, a smaller sized auxiliary pump 307 can be used for cost savings. Also due to the reduced flow needs to the handler cylinder 202 there will be reduced hydraulic heat rejection. The reduced hydraulic heat rejection also supports smaller charge air cooler, radiator, and/or a smaller hydraulic cooler size and the associated cost. By managing power then a lower cost engine and exhaust system can be implemented with the cotton picker baler 10.

The power savings enabled by using a regenerative raise operating condition and gravity lower or float down operating condition of the bale handler system 400 requires much less power even though the raising function occurs in a relatively short amount of time. The amount of power savings in the raise or lower operating conditions of the bale handler system 400 will vary based on numerous factors, including but not limited to, the type of engine 20, the type of the cotton picker baler 10 or other machine in which it is installed, other components of the bale handler system 34, and the mass of the round bale 28. This power savings can be diverted to other power consuming systems, not the bale handler system 34. Alternatively, a smaller less powerful engine can be installed with the cotton picker baler 10, which may be less expensive. Although the power savings is over a short time duration, it is at a critical time as other power consumer systems require this additional power. Although this is a short time duration for power savings, the accumulation of these time durations can add up to a substantial power savings and vary based on the amount of cotton that is collected by the accumulator and how often a full bale needs to be emptied from the baler. Moreover in a smaller machine the power savings will be more critical even if the amount of power savings is less as compared to a larger machine.

Turning now to FIGS. 4A-4D is a hydraulic schematic diagram for another bale handler system 400 having a control valve block 404, a first handler cylinder 402, and a second handler cylinder 403. The bale handler system 400 includes a handler similar to handler 200 that is operated by the first handler cylinder 402 and the second handler cylinder 403 which is operatively connected to the control valve block 404. The first handler cylinder 402, the second handler cylinder 403, and the control valve block 404 are operatively connected via a plurality of hoses (not illustrated) to fluidly pressurize a base end and a rod end of the first and second handler cylinders 402 and 403 as needed during operation. The first handler cylinder 402 includes a base end 410 opposite a rod end 412. The second handler cylinder 403 includes a base end 414 opposite a rod end 416.

Figure 4A:
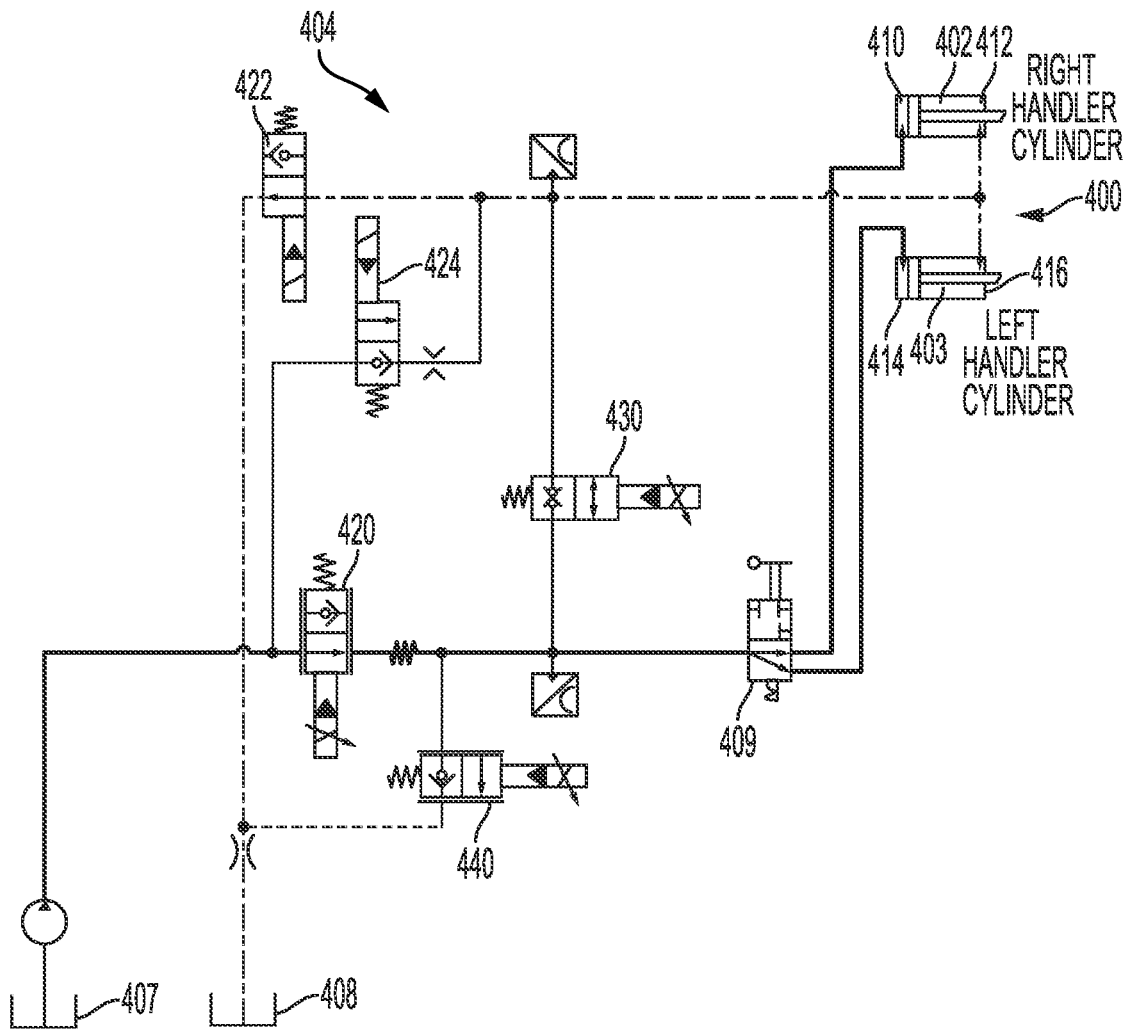
FIG. 4A is a hydraulic schematic diagram for another bale handler system having two handler cylinders in a normal raise mode of operation.

Instead of the lock valve 301 being connected to pilot operated check valve 315 as illustrated in FIGS. 3A-3D, the hydraulic schematic diagram in FIG. 4A discloses an alternative locking mode of operation to keep the bale handler system 400 from falling to the lowered position 34C if one of the plurality of hoses that connects the first and second handler cylinders 402 and 403 to the control valve block 404 fails. A locking condition of the bale handler system 400 is accomplished by a manual locking spool valve 409 that separates the based ends 410, 414 and the rod ends 412, 416 from each other so if one of the plurality of hoses fails to one of the first or second handler cylinders 402 or 403, then the non-failing handler cylinder will keep the handler 200 from either falling to the lowered position 34C or raising to the upright position 34A. The manual locking spool valve 409 operates like a locking mechanism to prevent raising and lowering of the bale handler system 400 in the event of a hose failure or at time of service of the handler 200.

Operatively and fluidly connected to the first and second handler cylinders 402 and 403 is an auxiliary pump 408 that provides flow and pressure to the first and second handler cylinders 402 and 403. In a normal powered mode of operation to raise the bale handler system 400 to the relatively upright position 34A wherein the auxiliary pump 408 provides flow as illustrated in FIG. 4A, a flow raise metering valve 420 is opened to allow flow into the base ends 410, 414 of the first and second cylinders 402, 403. The flow then travels from the first and second handler cylinders 402, 403, as the cylinders extend out the rod ends 412, 416 of first and second handler cylinders 402, 403, across solenoid restriction valve 422 and finally returns to a reservoir 408.

Figure 4B:
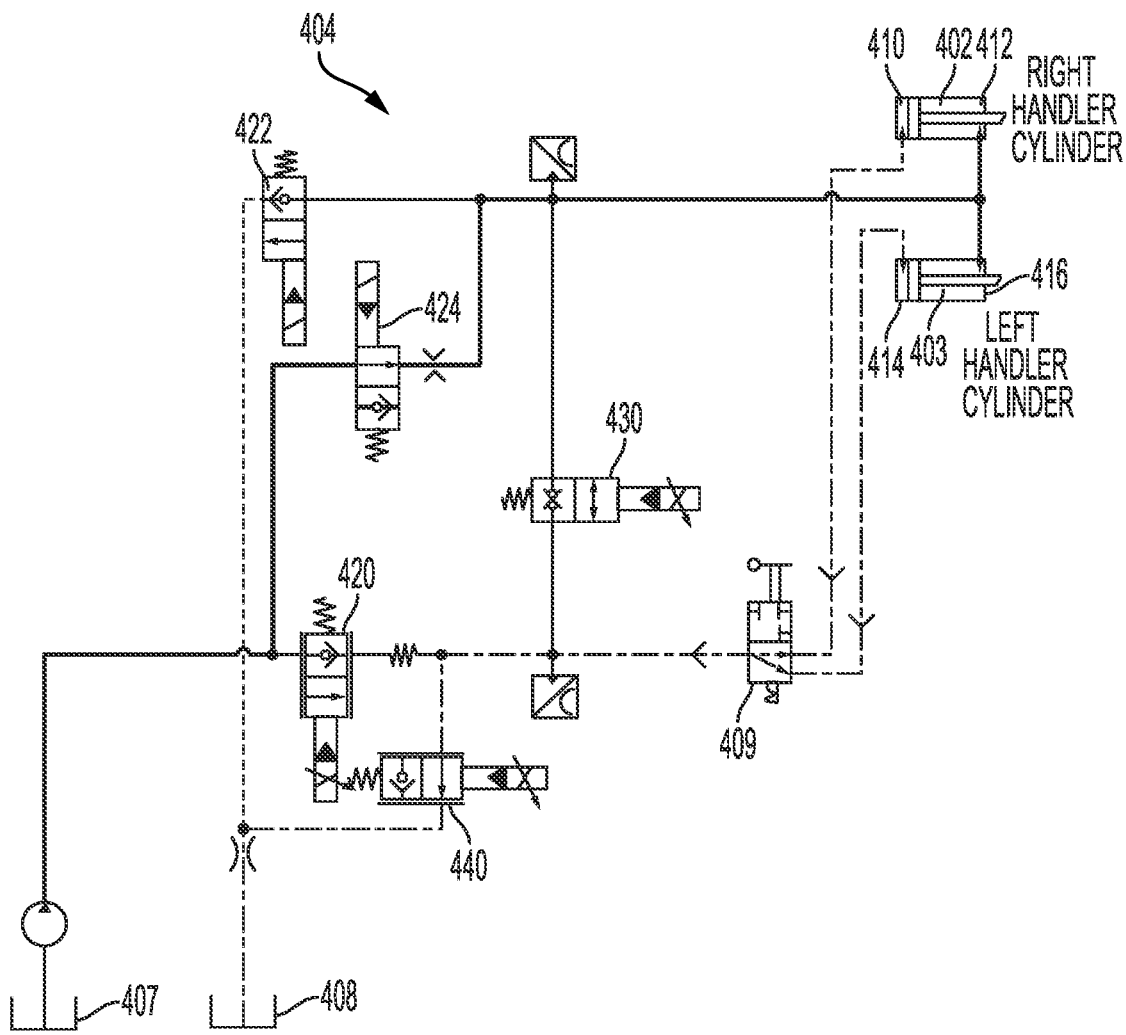
FIG. 4B is the hydraulic schematic diagram from FIG. 4A for the bale handler system having two handler cylinders in a normal lower mode of operation.

In a normal powered mode of operation to lower the bale handler system 400 to the lowered position 34C wherein the auxiliary pump 407 provides flow as illustrated in FIG. 4B, fluid from auxiliary pump 407 is pumped across a solenoid valve 424 and into the rod sides 412, 416 of the first and second handler cylinders 402, 403. The flow then travels from the first and second handler cylinders 402, 403 as the cylinders retract and out of the base ends 410, 414 across the locking spool valve 409 through proportional control valve 440, and then the flow returns to reservoir 408.

Figure 4C:
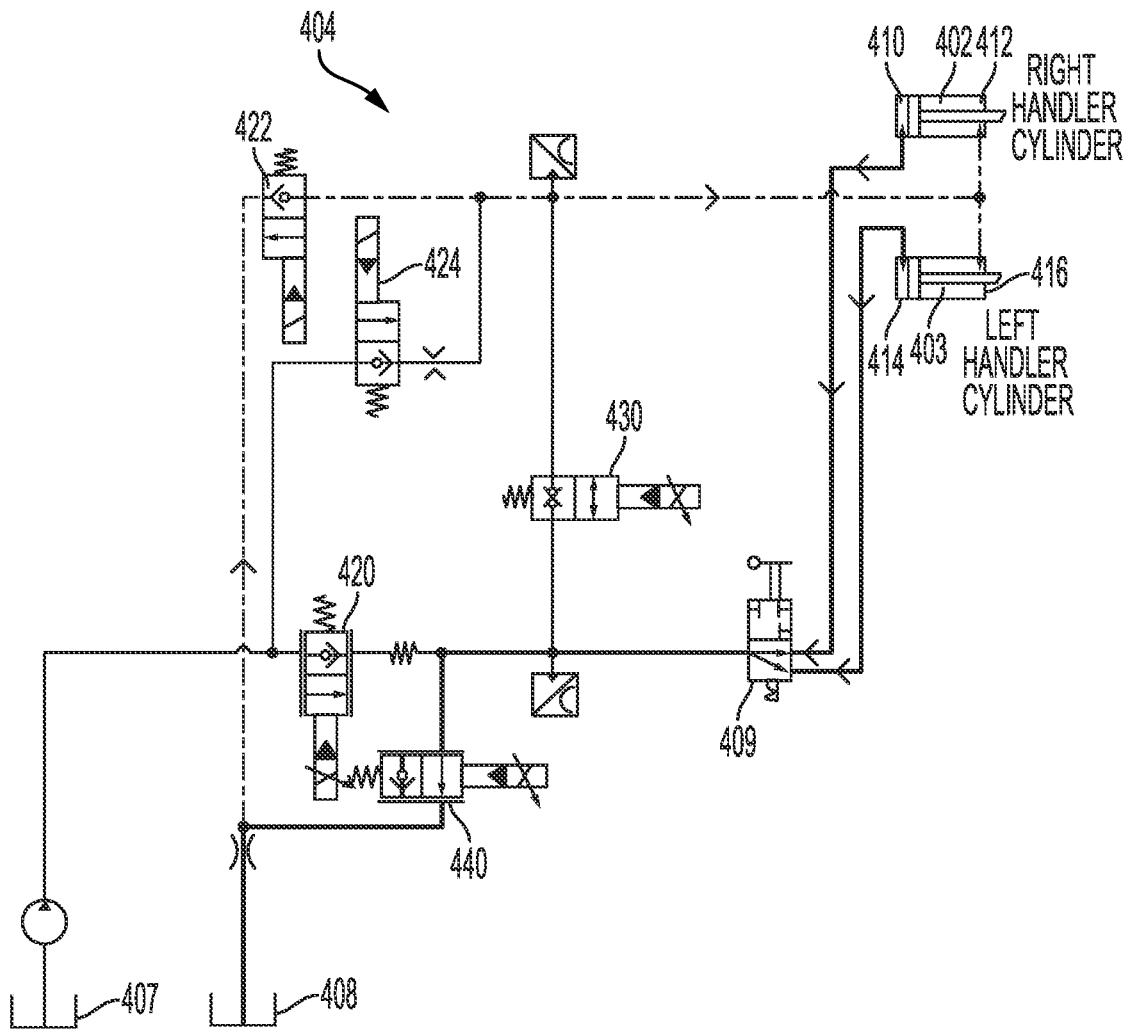
FIG. 4C is a hydraulic schematic diagram from FIG. 4A for the bale handler system having two handler cylinders in a float or gravity handler lower mode of operation.

Turning now to a float or gravity handler lower mode of operation illustrated in FIG. 4C wherein the first and second handler cylinders 402, 403 are extended and the bale handler system 400 contains or holds the round bale 28 in the upright position 34A, the horizontal position 34B, or some position there between, and the lowered position 34C. Alternatively, the bale handler system 400 may not contain the round bale 28 and maybe empty when the bale handler system 400 is lowered. In the float or gravity lower mode of operation, no additional fluid pressure or flow from the auxiliary pump 407 is required to lower the bale handler system 400 to lowered position 34C. A solenoid restriction valve 422 is opened or actuated to an open state, oil from the base ends 410, 414 flows or passes through a lower valve 440 and either passes to the reservoir 408 or provides an oil flow through solenoid restriction valve 422 to the rod ends 412, 416 of the first and second handler cylinders 402, 403. The bale handler system 400 lowers from an upright position 34A to a catch or horizontal position 34B to receive the round bale 28. Pressure is then applied to the rod ends 412, 416 from the base ends 410, 414 when the solenoid restriction valve 422 is opened so that oil can flow from reservoir 408 to lower the handler 200 to a carry position or the horizontal position 34B. The bale handler system 400 pauses in the carry position or the horizontal position 34B while both of the solenoid restriction valve 422 and the lower valve 440 are closed.

Figure 4D:
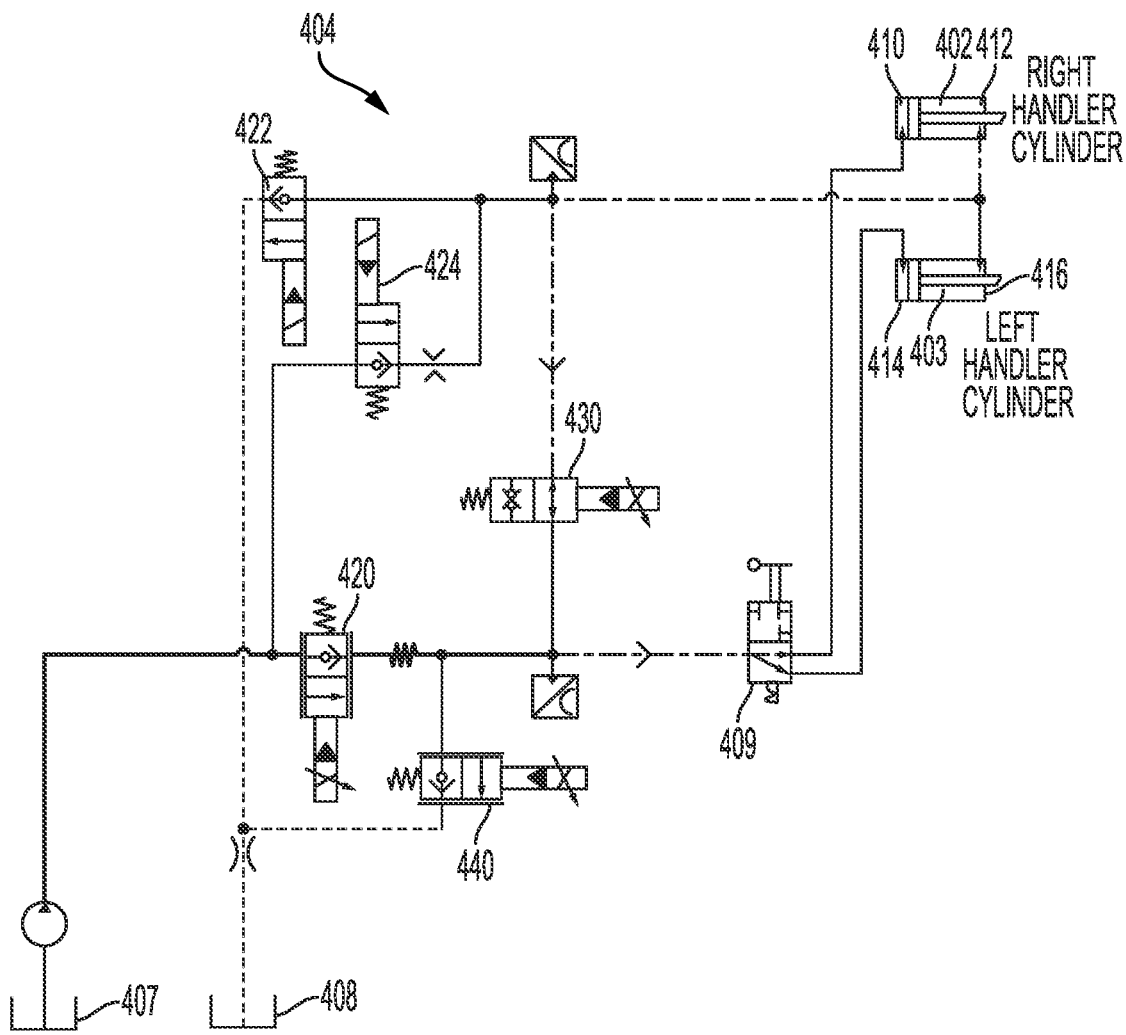
FIG. 4D is a hydraulic schematic diagram from FIG. 4A for the bale handler system having two handler cylinders in a regenerative handler raise mode of operation.

After the bale 28 is released to the ground 35, a regenerative handler raise mode of operation with the first and second handler cylinders 402, 403 will now be described as illustrated in FIG. 4D. A regenerative valve 430 is opened and the oil flows from the auxiliary pump 407 into the base ends 410, 414 of the first and second handler cylinders 402, 403 through the flow raise metering valve 420. The rod ends 412, 416 open and the oil flows across the regenerative valve 430 and oil also flows into the base ends 410, 414 of the first and second handler cylinders 402, 403. The bale handler system 400 raises to the upright position 34A.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural machine, comprising:
    a frame;
    a harvesting header coupled to the frame, the harvesting header configured to remove crop from a field;
    a module builder for receiving the crop and forming a bale of crop;
    a bale handler system coupled to the frame and being movable between a raised position where the bale handler system receives the bale of crop from the module builder and a lowered position, the bale handler system comprising a handler cylinder having a base end and a rod end; and
    a control valve block for hydraulically controlling the handler cylinder between an extended position and a retracted position, the control valve block comprising a first solenoid valve, a second solenoid valve, a third solenoid valve, and a regenerative valve;
    wherein, when moving the bale handler system to the raised position, the handler cylinder is extended by providing hydraulic fluid from a pump through the third solenoid valve to the base end of the cylinder, and redirecting hydraulic fluid from the rod end through the regenerative valve to the base end of the handler cylinder;
    wherein, when moving the bale handler system to the lowered position, the handler cylinder is retracted by opening the second solenoid valve, allowing hydraulic fluid to flow from the base end of the handler cylinder through the second solenoid valve where a first portion of the hydraulic fluid flows in a first flow path through the first solenoid valve to the rod end and a second portion of the hydraulic fluid flows in a second flow path through an orifice and a check valve to a reservoir.

2. The agricultural machine of claim 1, wherein the regenerative valve is closed when moving the bale handler system to the lowered position.

3. The agricultural machine of claim 1, wherein the regenerative valve is open only when moving the bale handler system to the raised position.

4. The agricultural machine of claim 1, further comprising a first check valve and a second check valve, the first and second check valves being fluidly coupled between the regenerative valve and the base end of the handler cylinder.

5. The agricultural machine of claim 4, wherein when the regenerative valve is open, hydraulic fluid flows along a third flow path from the rod end through the regenerative valve, the first check valve, and the second check valve to the base end.

6. The agricultural machine of claim 1, wherein the second solenoid valve is closed when the regenerative valve is open.

7. The agricultural machine of claim 1, wherein the pump does not provide additional hydraulic fluid to the handler cylinder when moving the bale handler system to the lowered position.

8. An agricultural machine, comprising:
    a frame;
    a harvesting header coupled to the frame, the harvesting header configured to remove crop from a field;
    a module builder for receiving the crop and forming a bale of crop;
    a bale handler system coupled to the frame and being movable between a raised position where the bale handler system receives the bale of crop from the module builder and a lowered position, the bale handler system comprising a handler cylinder having a base end and a rod end; and
    a control valve block for hydraulically controlling the handler cylinder between an extended position and a retracted position, the control valve block comprising a first solenoid valve, a second solenoid valve, a third solenoid valve, a regenerative valve, and a first check valve;
    wherein, the first check valve and a second check valve are fluidly coupled between the regenerative valve and the base end of the handler cylinder;
    wherein, when moving the bale handler system to the raised position, the handler cylinder is extended by providing hydraulic fluid from a pump through the third solenoid valve to the base end of the cylinder, and redirecting hydraulic fluid flows along a flow path from the rod end through the regenerative valve, the first check valve, and the second check valve to the base end.

9. The agricultural machine of claim 8, wherein, when moving the bale handler system to the lowered position, the handler cylinder is retracted by opening the second solenoid valve to allow hydraulic fluid to flow from the base end of the handler cylinder through the second solenoid valve where a portion of the hydraulic fluid flows in a second flow path through the first solenoid valve to the rod end of the handler cylinder.

10. The agricultural machine of claim 9, wherein another portion of the hydraulic fluid flows in a third flow path to a reservoir.

11. The agricultural machine of claim 8, wherein the regenerative valve is closed when moving the bale handler system to the lowered position.

12. The agricultural machine of claim 8, wherein the regenerative valve is open only when moving the bale handler system to the raised position.

13. The agricultural machine of claim 8, wherein the second solenoid valve is closed when the regenerative valve is open.

* * * * *